Sept. 18, 1962  R. H. RICHARD  3,054,951
DEVICE FOR MEASURING THE ROOT MEAN SQUARE
VALUE OF A SLOWLY VARYING VOLTAGE
Filed Nov. 4, 1958
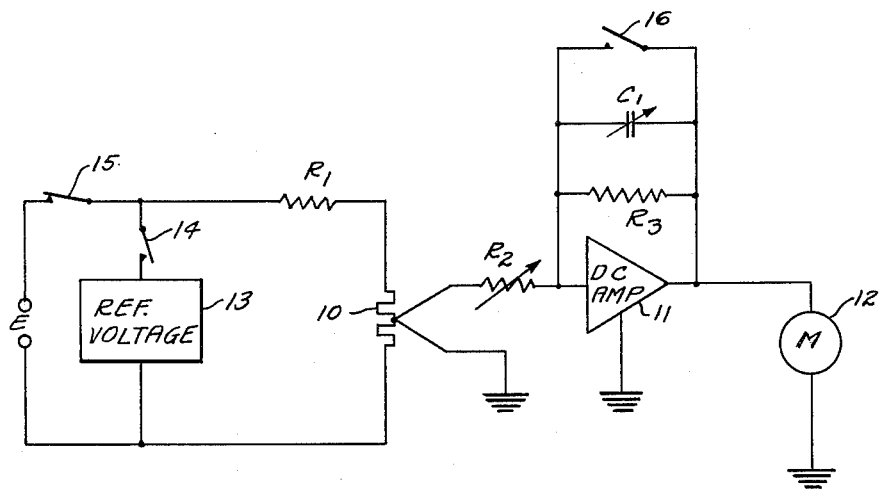
INVENTOR.
ROBERT H. RICHARD
BY
ATTORNEY
AGENT 3,054,951
DEVICE FOR MEASURING THE ROOT MEAN SQUARE VALUE OF A SLOWLY VARYING VOLTAGE
Robert H. Richard, Baltimore, Md., assignor to the United States of America as represented by the Secretary of the Air Force
Filed Nov. 4, 1958, Ser. No. 771,930
2 Claims. (Cl. 324—106)

This invention relates to a device for measuring the root-mean-square value of very low frequency randomly varying voltages.

One object of the invention is to provide a device for accurately measuring the root-mean-square value for randomly varying voltages of very low frequencies including those below one cycle.

This and other objects will be more fully understood from the following detailed description taken with the drawing wherein, the single FIGURE shows a voltage measuring circuit according to one embodiment of the invention.

The root-mean-square or R.M.S. value of a function of time $e(t)$ is defined as:

$$E_{rms} = \left\{ \lim_{T \to \infty} \frac{1}{T} \int_0^T [e(t)]^2 dt \right\}^{1/2}$$

In order for an instrument to measure this quantity when $e(t)$ is, say, a voltage which is a function of time, it is necessary that the instrument first obtain a quantity which is proportional to the square of the input voltage, then to take the time average of this quantity and, finally, to produce an indication which is proportional to the square root of this time average.

It is not necessary in practice that the averaging time T be infinitely long but only that it be long compared to the period of the lowest frequency components of the function $e(t)$. Also it is not necessary to determine analytically the required length of the averaging time T. One is assured that T is sufficiently long if the indication of the average value is constant with time or varies only within the allowed limits of accuracy.

The operation of taking the square root can be performed merely by scaling the indicating device properly.

It is necessary however that the operations of squaring, averaging, and taking the square root be performed in that order.

Strictly speaking, the R.M.S. value of any particular voltage cannot change with time since the R.M.S. value is defined as an average overall time. However, in many practical applications one is concerned with what is loosely called the R.M.S. value during a given period of time as compared to the R.M.S. value during another period of time. In such cases the measuring instrument must be capable of "forgetting" previously determined R.M.S. values and redetermining new values as time progresses. One of the problems in designing and using a R.M.S. meter is to determine the length of time over which the averaging should be done. If the voltage to be measured is periodic, the problem is relatively straightforward. For nonperiodic or random voltages, however, the desired averaging time may depend on the particular application.

At any rate, the type of averaging usually used in practice is a type of weighted time-average. In this type of averaging the indicated value at a time $t_0$ is proportional to the average over times previous to $t_0$ and, in addition, values of the function at times far removed from $t_0$ are given less weight than those near $t_0$.

The averaging time for the device of this invention is approximately equal in seconds to the product $R_3C_1$ ($R_3$ in ohms, $C_1$ in farads), which can be made quite long. Time constants up to 100 seconds are easy to obtain.

Another important point is that the integrating time can be changed easily, by switching in different capacitors, without changing the calibration of the device. This is important since the time required to make a measurement is about ten times the time constant so that one would want to use the shortest possible time constant consistent with the lowest frequency components of the input voltage.

The device of this invention uses a thermocouple, similar to those used in commercially available thermocouple meters. The drawing shows a randomly varying voltage E applied to the thermocouple heater 10 through a resistance $R_1$ so that a current proportional to the applied voltage E passes through the thermocouple heater and raises the temperature of the thermocouple to a point dependent on the power dissipated in the heater. The output voltage of the thermocouple is then proportional to the square of the applied voltage. The output of the thermocouple is applied to a D.C. amplifier 11 through a variable resistance $R_2$. Capacitor $C_1$ is connected between the output and input of amplifier 11. The output of the amplifier is then proportional to the integral of the input voltage over a time depending on the values of $R_2$, $R_3$, $C_1$ and the gain of the amplifier. Therefore, since the input voltage of the amplifier is proportional to the square of the applied voltage E, the output will be a D.C. voltage proportional to the mean-square value of the applied voltage. An indicating D.C. meter 12 will read the output voltage of the amplifier 11. This meter may be calibrated to read either the output voltage of the amplifier directly or its square root, that is the root mean square of the applied voltage E. The integrating time may be changed by changing the value of the capacitor $C_1$ so that the reading can be made in the minimum time depending upon the frequency of the applied voltage. The resistance $R_2$ is made variable so that any one of several voltage ranges may be selected. A reference voltage source 13 is provided for the purpose of calibrating the device. Switches 14 and 15 are provided for opening the circuit to the applied voltage source E and for closing the circuit to the reference source 13. A switch 16 is provided for shorting out the capacitor $C_1$ and for resetting the device to zero instantaneously. In one model constructed, a chopper type D.C. amplifier was used for the amplifier 11.

A meter which was tested was found to give accurate readings for voltages of known root-mean-square value at various frequencies. Input voltages at frequencies as low as .01 cycle per second have been measured and it is possible to measure even lower frequency voltages.

There is thus provided a device for measuring the root mean square value for randomly varying voltages of very low frequencies including those below one cycle.

While one specific embodiment has been described in some detail, it is obvious that numerous changes may be made without departing from the general principles and scope of the invention.

I claim:

1. A voltage measuring device for obtaining the root-mean-square value of a source of low frequency voltage having a complex waveform, the device consisting of a thermocouple, means for applying said voltage to the heater element of said thermocouple, a variable resistor connecting the output of said thermocouple to the input of a direct current amplifier, integrating means consisting of a resistor in parallel with a variable capacitor connected across said direct current amplifier, and an indicating direct current meter connected to the output of said direct current amplifier.

2. A voltage measuring device for obtaining the root-mean-square value of a low frequency voltage having a complex waveform consisting of a thermocouple, means for applying said low frequency voltage to the heater element of the thermocouple, said thermocouple producing an output voltage proportional to the square of said low frequency voltage, a direct current amplifier, a variable resistor connecting the output of said thermocouple to the input of the direct current amplifier, integrating means connected across the amplifier, said integrating means consisting of a variable capacitor connected in parallel with a resistor, whereby the output voltage of said direct current amplifier is proportional to the mean-square value of said low frequency voltage, switch means connected across said variable capacitor, and an indicating direct current meter connected directly to the output of said direct current amplifier.

References Cited in the file of this patent

UNITED STATES PATENTS

| | | |
|---|---|---|
| 2,059,594 | Massa | Nov. 3, 1936 |
| 2,114,298 | Gunn | Apr. 19, 1938 |
| 2,300,198 | Brown | Oct. 27, 1942 |
| 2,563,395 | Carpentier | Aug. 7, 1951 |
| 2,744,240 | Hughes | May 1, 1956 |
| 2,842,740 | Sparks | July 8, 1958 |
| 2,857,569 | Gilbert | Oct. 21, 1958 |